United States Patent Office 2,962,465
Patented Nov. 29, 1960

2,962,465

PRODUCTION OF ACRYLATE INTERPOLYMER AQUEOUS LATICES

Mary D. Lindstrom, Springfield, and Raymond A. Barkhuff, Jr., East Longmeadow, Mass., assignors to Monsanto Chemical Company, St. Louis, Mo., a corporation of Delaware No Drawing. Filed Jan. 22, 1958, Ser. No. 710,412

8 Claims. (Cl. 260—29.6)

This invention relates to the production of vinylidene polymer latices and more particularly to a catalytic emulsion polymerization process for the production of such latices.

Vinylidene polymer latices have found broad application in the field of surface coating particularly as binders for coatings on textile and paper substrates. The requirements for binders so utilized, and particularly when used to bind particulate materials such as clay and the like to paper substrates, is accompanied by stringent requirements. The basic requirements are good adhesion, in conjunction with color, chemical and mechanical stability. A considerable segment of the present practice in this area of the coating art has evolved to the use of vinylidene polymer latices and more particularly to acrylate-based latices. However, the acrylates used to date have not completely satisfied all of the above requirements. More specifically, those presently used would be far more attractive for the desired purposes if they exhibited greater adhesion and mechanical stability, the latter reflecting resistance to coagulation when subjected to mixing and other mechanical working generally accompanying coating preparations.

It is a principal object of the present invention to produce acrylate-based latices exhibiting improved adhesion when utilized to bind clay coatings to paper substrates.

Other objects will in part be obvious and will in part appear hereinafter.

These and other objects are attained by interpolymerizing (1) an ester selected from the class consisting of acrylates and methacrylates the alcohol moiety of which contains 5–18 carbon atoms, (2) an unsaturated acid selected from the class consisting of acrylic acid, methacrylic acid, cinnamic acid, atropic acid and crotonic acid, (3) at least one hardening comonomer of the group consisting of monovinylidene aromatic hydrocarbons, and esters of methacrylic acid the alcohol moiety of which contains 1–3 carbon atoms by a catalytic emulsion polymerization which involves partially polymerizing a portion of said hardening comonomer comprising 10–50% by weight of the total monomer charge followed by addition of the remainder of the monomers and completing the polymerization.

The following examples are given to illustrate the invention. Parts mentioned are parts by weight unless otherwise designated.

EXAMPLE I

The following charges are premixed for use in this reaction:

Kettle charge: Parts
Water _____ 40.0
Tetrasodium pyrophosphate _____ .04
Tridecanol polyethylene oxide condensate ___ .965
Sodium salt of an aralkyl polyether sulfate ____ .234
Ethylene glycol _____ .05

Catalyst charge A: Parts
Water _____ 13.1
Potassium persulfate _____ .131
Potassium sulfate _____ .131
Tridecanol polyethylene oxide condensate ____ .05
Sodium salt of an aralkyl polyether sulfate ___ 1.02

Monomer charge I: Parts
Styrene _____ 9.96

Monomer charge II:
Styrene _____ 14.3
2-ethylhexyl acrylate _____ 14.3
Methacrylic acid _____ 1.2

Catalyst charge B:
Hydrogen peroxide (30%) _____ .2
Water _____ .8

Neutralization charge:
Ammonium hydroxide _____ 1.0

Stabilizer charge:
Tridecanol polyethylene oxide condensate ___ 2.5

The reaction vessel which can be used is a 2-liter, four necked round-bottomed flask fitted with a reflux condenser, agitator, thermometer and a pair of charging funnels. The reaction vessel or kettle charge is added and heated under agitation to reflux temperature. Five-sixths of catalyst charge A is then slowly and continuously added under agitation over approximately an 80-minute period. This is accompanied during the first portion, or approximately 30 minutes, of this period by slow addition of monomer charge I and during the remainder of the period by slow addition of monomer charge II. The mixture is continued at reflux temperature until a slight temperature peak in the reaction occurs, at which time the remaining one-sixth of catalyst charge A is added. One hour later catalyst charge B is added to completely react traces of residual monomer. Polymerization is substantially complete about 200 minutes after the start of the reaction. The resulting latex is then cooled and neutralized with 1 part of ammonium hydroxide (neutralization charge) and 2.5 parts of a tridecanol ethylene oxide condensate (stabilizer charge) is added to stabilize the latex.

The product of the reaction is an interpolymer latex containing about 40% solids and having an average particle size of about 0.1–0.25 micron.

A series of clay coated paper samples are prepared using as binders:

(1) A portion of the latex resulting from the preceding example;
(2) Commercially available GRS latex coating;
(3) Commercially available acrylate latex (Rhoplex B60K);
(4) Latex having the same components and prepared by the process presently sponsored but with 3 parts of acrylonitrile substituted for 3 parts of styrene in the first monomer charge.

A portion of each, representing 18 parts, is intimately mixed with 82 parts of standard clay-pigment dispersion and knife coated onto a sheet of internally sized soda pulp paper stock. After drying for 2 minutes at about 112° C., the treated paper is evaluated for printability on a Vandercook Proof-Press, and other physical and chemical properties observed. These are as follows:

Table I

| Sample | (1) | (2) | (3) | (4) |
| --- | --- | --- | --- | --- |
| Printability | A | A— | A— | B+. |
| U.V. stability | Excellent | Poor | Excellent | Good. |
| Gloss | Good | Fair | Good | Good. |
| Wet rub | Fair | Poor | Fair | Fair. |
| Mechanical stability | B+ | C— | D | B+. |
| Chemical tolerance (to calcium) | Excellent | Excellent | Excellent | Excellent. |

Consideration of the test data indicates the uniformly high standards manifest by the products resulting from exercise of the present invention. Of particular note is the advance exhibited by the products of the present invention with respect to mechanical stability which reflects resistance to coagulation when subjected to mechanical working. In coating applications, it becomes necessary to subject the binder to such working, particularly milling, rolling, etc., in order to incorporate colorants, clays, etc., as well as during actual application. The proneness of prior art acrylates to coagulate when subjected to these conditions has resulted in severe diminution of efficiency in the coating operation as well as to the resulting product particularly when coating on comparatively fragile and fibrous substrates of the nature of paper.

The present invention is directed to producing an aqueous latex of an interpolymer adapted for binding clay coatings to paper which comprises (1) about 25–45% by weight of at least one ester selected from the class consisting of acrylates and methacrylates the alcohol moiety of which contains 5–18 carbon atoms, (2) about 1–5% by weight of at least one unsaturated acid selected from the class consisting of acrylic acid, methacrylic acid, cinnamic acid, atropic acid and crotonic acid, (3) about 50–74% by weight of at least one hardening comonomer of the group consisting of monovinylidene aromatic hydrocarbons, halogenated derivatives of monovinylidene aromatic hydrocarbons, and esters of methacrylic acid, the alcohol moiety of which contains 1–3 carbon atoms, by a catalytic emulsion polymerization process comprising adding at constant rate to an aqueous medium containing an emulsifier and a major portion of the water requirement for said process maintained at polymerization temperature an aqueous composition containing polymerization catalyst together with a first monomer charge comprised essentially of hardening comonomer and equal to 10–50% by weight of the total monomer charge, and a second monomer charge comprising the remainder of the monomers, and thereafter maintaining the resultant reaction mixture at polymerization temperature until polymerization is substantially complete.

The esters, exclusive of those included as hardening comonomers, which can be included in the present invention, are esters of acrylic acid and methacrylic acid the alcohol moiety of which contains 5–18 carbon atoms. These include hexyl acrylate, octyl acrylate, 2-ethylhexyl acrylate, decyl acrylate, tridecyl acrylate, hexadecyl acrylate, octadecyl acrylate, hexyl methacrylate, decyl methacrylate, tridecyl methacrylate, hexadecyl methacrylate, etc. Mixtures of two or more such esters can be used, if so desired. The preferred acrylate is 2-ethylhexyl acrylate. The amount of acrylate which can be used ranges between 25–45% by weight of the interpolymer with the further preference directed to 35–40% by weight. When using 2-ethylhexyl acrylate 37% by weight has been found attractive.

The unsaturated acid component is a member of the group consisting of acrylic acid, methacrylic acid, cinnamic acid, atropic acid and crotonic acid. The acrylic and methacrylic acid have been found the more desirable. Mixtures of the unsaturated acids can be used with good results. The amounts of such acids to be used are 1–5% by weight of the interpolymer with a further preference of 2–3% by weight.

The hardening comonomer is selected from the group consisting of monovinylidene aromatic hydrocarbons, halogenated derivatives of monovinylidene aromatic hydrocarbons and esters of methacrylic acid the alcohol moiety of which contains 1–3 carbon atoms. Suitable monovinylidene aromatic compounds which can be incorporated include styrene, alpha-methyl styrene, alpha-methyl-p-methyl styrene, p-methyl styrene, m-ethyl styrene, p-isopropyl styrene, p-chloro styrene, 2,4-dichloro styrene, 2,5-dichloro styrene, p-bromo styrene, vinyl naphthalene, etc. The methacrylates which can be included are the methyl, ethyl and propyl. Mixtures of two or more such compounds may be used if desired. The hardening comonomer preferably constitutes 50–74% by weight of the interpolymer, with a further preference directed to 58–63% by weight. When styrene is to be used a desirable amount has been determined as being about 60% by weight of the interpolymer.

The latices which result can be visualized as forming a hard core or cores with comparatively soft shells or exteriors. The cores consist of that portion of the hardening comonomer added as the first monomer charge which is in turn constituted essentially of all hardening comonomer. In addition, the core size can be 10–50% of the polymer by weight. Acrylate in the shell can range between 25–45% of the polymer by weight. When the core size is large (50%) the acrylate content must be high (40–50% of the polymer weight) to ensure fusion. Optimum performance can be obtained at about 25% core size, 37.5% acrylate.

The process to which the present invention is directed is an aqueous catalytic emulsion interpolymerization. The amount of water used can be varied according to solid content desired for the final latex. Solid contents ranging between 40–48% have been found to give desirable binding qualities when used to adhere clay coatings to paper substrates. Preferably, about 100–250 parts of water to 100 parts of monomer mixture to form latices having solid contents of about 30–50% is used.

Suitable polymerization catalysts or initiators include conventional free-radical generating catalysts, such as potassium persulfate, lauroyl peroxide, di-tertiary-butyl peroxide, cumene hydroperoxide, etc. Two or more such initiators may be used if desired. When the polymerization is conducted at temperatures below reflux, catalysts of the redox type may be used, e.g., potassium persulfate with sodium bisulfite, hydrogen peroxide with ferrous sulfate, hydrogen peroxide with ferric sulfate and sodium pyrophosphate, etc. Usually, about 0.01–1 part of initiator is used per 100 parts of monomer mixture.

The emulsifier may be one or more of a variety of anionic and nonionic emulsifiers such as salts of high molecular weight fatty acids, amine soaps, alkali metal salts of rosin acids, alkali metal salts of long-chain alkyl sulfonates and sulfates, ethylene oxide condensates of long-chain fatty acids, alcohols or mercaptans, sodium salts of sulfonated hydrocarbons, sodium salts of aralkyl sulfonates, etc. Particularly useful is a combination of a tridecanol-ethylene oxide condensate and an alkali metal salt of an aralkyl polyether sulfate, e.g., sodium octyl phenyl polyether sulfate. Usually about 0.1–5 parts of emulsifier are used per 100 parts of monomer mixture.

In the polymerization process presently sponsored, the ingredients of the polymerization formulation are premixed to form four essential charges: kettle charge, catalyst charge, monomer charge I, and monomer charge II. The kettle charge comprises a major portion of the water requirement and, optionally, a minor amount of the polymerization catalyst and/or the emulsifier. The catalyst charge comprises a minor amount of the water requirement, all or a major portion of the polymerization catalyst, and all or a major portion of the emulsifier.

Conventional polymerization aids, such as buffers, particle size regulators, activators, etc., may be present in the reaction vessel charge and/or the catalyst charge.

The first monomer charge or monomer charge I is comprised essentially of hardening comonomer. The amount is limited in comparison to the total weight of the monomers to be charged, i.e., 10–50% by weight of the total monomers to be charged, and by the amount of hardening comonomer which is present in the second monomer charge or monomer charge II.

Monomer charge II comprises the remainder of the monomers to be charged. At least 10% of the total weight of monomer charge II should consist of the hardening comonomer.

In the polymerization process the kettle charge is added to a suitable reaction vessel and heated to polymerization temperature and preferably accompanied by agitation. The polymerization can be conducted at temperatures of about 30–150° C., and under sub-atmospheric, atmospheric or super-atmospheric pressure, the preferred conditions are reflux temperature and atmospheric pressure. The reaction vessel can be purged of oxygen by conventional methods, e.g., by flushing with nitrogen, bringing the kettle charge to reflux temperature, etc.

After addition of the kettle charge, a major portion of the catalyst charge is added slowly and continuously, at constant rate, again preferably accompanied by agitation, over a period of about 1–2 hours, more preferably about 80 minutes. In the preferred procedure only about 75–90% and preferably about 83% of the catalyst charge is added at this time with the remainder being reserved for use at the temperature peak of the reaction which occurs generally some 20 minutes after completion of charging of the monomers. Simultaneously, with the first period of catalyst addition, a period of about 30 minutes, monomer charge I is added at substantially constant rate. Thereafter, monomer charge II is similarly added paralelleling addition of the remainder of the 75–90% portion of the catalyst charge.

After addition of this portion of catalyst charge and the monomer charges, the reaction is maintained at polymerization temperature for about 2–20 hours to complete the reaction. To ensure substantially complete polymerization the remaining 10–25% of catalyst charge, which has been reserved, is added as a catalyst slug when a mild temperature peak in the reaction occurs. The polymerization continues for a period of some 60 minutes after which a further catalyst charge, identified as catalyst charge B in the exemplary material, can be added if the occasion dictates. When the reaction is conducted at reflux temperature polymerization is substantially complete when a constant boiling point is reached. Unreacted monomer present in the latex at the end of the reaction can be removed by conventional procedure, e.g., distillation.

The latices at this stage, upon completion of polymerization, have an acid pH and although they can be used as such, they are preferably adjusted to a pH of about 8–10 with a basic material such as ammonia or an alkali metal or ammonium salt of a water-soluble organic acid which has been denominated as the neutralization charge. It is then preferable in order to enhance stability of the latices to add further amounts of a nonionic or anionic emulsifier of the types mentioned above, specifically, this has been previously identified as the stabilizer addition charge.

Applications for the latices of this invention include binders for mineral coating compositions onto paper and other substrates, surface coatings on various heated substrates, or films, textile size and the like. When used as binders for mineral compositions, mineral material such as clay is incorporated in particulate form into the binder as by rolling, milling and the like prior to application onto the paper or other substrate.

It will thus be seen that the objects set forth above, among those made apparent from the preceding description, are efficiently attained and, since certain changes may be made in carrying out the described invention without departing from the scope thereof, it is intended that all matter contained in the above description shall be interpreted as illustrative and not in a limiting sense.

What is claimed is:

1. A process for producing an aqueous interpolymer latex, the said interpolymer consisting of, in polymerized form, (1) about 25–45% by weight of at least one ester selected from the class consisting of alkyl esters of acrylic acid and methacrylic acid, the alcohol moieties of which contain 5–18 carbon atoms, (2) about 1–5% by weight of at least one unsaturated acid selected from the class consisting of acrylic acid, methacrylic acid, cinnamic acid, atropic acid and crotonic acid (3) about 50–74% by weight of at least one hardening comonomer of the group consisting of monovinylidene aromatic hydrocarbons, halogenated derivatives of monovinylidene aromatic hydrocarbons, and alkyl esters of methacrylic acid, the alcohol moieties of which contain 1–3 carbon atoms, said interpolymer latex being produced by a catalytic emulsion polymerization process comprising the steps of providing at polymerization temperature of about 30–150° C. an aqueous medium containing an emulsifier selected from the class consisting of anionic and nonionic emulsifiers, and a major portion of the water requirement for said latex, and while maintaining the said temperature adding slowly and in sequence to said aqueous medium at substantially constant rate a first monomer charge and a second monomer charge, said first monomer charge being constituted essentially of hardening comonomer and being equal to 10–50% by weight of the total monomer charge, said second monomer charge comprising the remainder of the monomers and wherein at least 10% by weight of said second monomer charge consists of hardening comonomer, both of said monomer charges being accompanied by addition at constant rate of an aqueous composition containing a free radical polymerization catalyst and thereafter maintaining the resultant reaction mixture at polymerization temperature until polymerization is substantially complete.

2. A process as in claim 1 wherein the interpolymer consists of, in polymerized form, 35–40% by weight of at least one alkyl ester selected from the class consisting of esters of acrylic and methacrylic acid, the alcohol moieties of which contain 5–18 carbon atoms.

3. A process as in claim 1 wherein the interpolymer consists of, in polymerized form, about 2–3% by weight of at least one unsaturated acid selected from the class consisting of acrylic acid, methacrylic acid, cinnamic acid, atropic acid and crotonic acid.

4. A process as in claim 1 wherein the interpolymer consists of, in polymerized form, about 58–63% by weight of at least one hardening comonomer selected from the class consisting of monovinylidene aromatic hydrocarbons, halogenated derivatives of monovinylidene aromatic hydrocarbons and alkyl esters of methacrylic acid, the alcohol moieties of which contain 1–3 carbon atoms.

5. A process as in claim 1 wherein the interpolymer consists of, in polymerized form, (1) 35–40% by weight of at least one ester selected from the class consisting of alkyl esters of acrylic acid and methacrylic acid, the alcohol moieties of which contain 5–18 carbon atoms, (2) about 2–3% by weight of at least one unsaturated acid selected from the class consisting of acrylic acid, methacrylic acid, cinnamic acid, atropic acid and crotonic acid, (3) about 58–63% by weight of at least one hardening comonomer of the group consisting of monovinylidene aromatic hydrocarbons, halogenated derivatives of monovinylidene aromatic hydrocarbons, and alkyl esters of methacrylic acid, the alcohol moieties of which contain 1–3 carbon atoms.

6. A process as in claim 1 wherein the interpolymer consists of, in polymerized form, (1) about 37% by weight of 2-ethylhexyl acrylate, (2) about 3% by weight of methacrylic acid, (3) about 60% by weight of styrene and wherein about 10–50% by weight of styrene on the weight of the total monomers is polymerized prior to adding the remainder of the monomers and completing the polymerization.

7. A process as in claim 1 wherein the polymerization temperature is reflux temperature.

8. A process as in claim 1 wherein the monomeric charges are totally added over a period of about 80 minutes.

References Cited in the file of this patent
UNITED STATES PATENTS

| | | |
|---|---|---|
| 2,726,230 | Carlson | Dec. 6, 1955 |
| 2,767,153 | Sutton | Oct. 16, 1956 |
| 2,795,564 | Conn | June 11, 1957 |
| 2,837,444 | Hahn | June 3, 1958 |